United States Patent
Park et al.

(10) Patent No.: US 10,282,994 B2
(45) Date of Patent: May 7, 2019

(54) WIRELESS COMMUNICATION APPARATUS AND METHOD FOR SUPPORTING VEHICLE-TO-VEHICLE WIRELESS COMMUNICATION

(71) Applicant: HYUNDAI MOTOR COMPANY, Seoul (KR)

(72) Inventors: Jong Rok Park, Seoul (KR); Dong Gyu Noh, Dongducheon-si (KR); Cho Rong Ryu, Incheon (KR); Dae Sung Hwang, Hwaseong-si (KR); Hahk Rel Noh, Bucheon-si (KR); Su Lyun Sung, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 13 days.

(21) Appl. No.: 15/366,778

(22) Filed: Dec. 1, 2016

(65) Prior Publication Data

US 2018/0033303 A1  Feb. 1, 2018

(30) Foreign Application Priority Data

Jul. 29, 2016 (KR) ........................ 10-2016-0097364

(51) Int. Cl.
*G08G 1/16* (2006.01)
*G08G 1/0967* (2006.01)
(Continued)

(52) U.S. Cl.
CPC ....... *G08G 1/161* (2013.01); *G08G 1/096716* (2013.01); *G08G 1/096791* (2013.01);
(Continued)

(58) Field of Classification Search
CPC .. G08G 1/161; G08G 1/166; G08G 1/096791; H04W 84/18
See application file for complete search history.

(56) References Cited

U.S. PATENT DOCUMENTS

| | | | |
|---|---|---|---|
| 7,046,168 B2* | 5/2006 | Tsuboi | G08G 1/096716 340/425.5 |
| 2012/0025965 A1* | 2/2012 | Mochizuki | B60Q 9/008 340/435 |
| 2014/0148999 A1* | 5/2014 | Goudy | G08G 1/163 701/41 |

FOREIGN PATENT DOCUMENTS

| JP | 2011-180689 A | 9/2011 |
|---|---|---|
| JP | 5175634 B2 | 4/2013 |

(Continued)

OTHER PUBLICATIONS

Korean Office Action issued in corresponding Korean Patent Application No. 10-2016-0097364, dated Dec. 18, 2017.

*Primary Examiner* — Ryan W Sherwin
(74) *Attorney, Agent, or Firm* — Morgan Lewis & Bockius LLP

(57) ABSTRACT

There are provided wireless communication apparatus and method selecting an operation candidate application based on vehicle driving information and configuring a multi-hop communication node tree based on other vehicles having an attribute required for the corresponding operation candidate application, in order to effectively transmit data by decreasing communication load for data transmission and avoiding an obstacle in a multi-hop communication environment based on vehicle-to-anything (V2X) communication.

12 Claims, 7 Drawing Sheets

(51) Int. Cl.
  *H04W 4/46* (2018.01)
  *H04W 4/50* (2018.01)
  H04W 84/18 (2009.01)
  H04L 29/08 (2006.01)
(52) U.S. Cl.
  CPC ............. *G08G 1/163* (2013.01); *G08G 1/166* (2013.01); *H04W 4/46* (2018.02); *H04W 4/50* (2018.02); H04L 67/12 (2013.01); H04W 84/18 (2013.01)

(56) References Cited

FOREIGN PATENT DOCUMENTS

| | | |
|---|---|---|
| KR | 10-2009-0056070 A | 6/2009 |
| KR | 10-0906303 B1 | 7/2009 |
| KR | 10-2010-0103178 A | 9/2010 |
| KR | 10-2014-0038180 A | 3/2014 |
| KR | 10-1382656 B1 | 4/2014 |

* cited by examiner

WIRELESS COMMUNICATION APPARATUS AND METHOD FOR SUPPORTING VEHICLE-TO-VEHICLE WIRELESS COMMUNICATION

CROSS-REFERENCE TO RELATED APPLICATION

This application is based on and claims the benefit of priority to Korean Patent Application No. 10-2016-0097364, filed on Jul. 29, 2016 in the Korean Intellectual Property Office, the disclosure of which is incorporated herein in its entirety by reference.

TECHNICAL FIELD

The present disclosure relates to a wireless communication apparatus and method, and more particularly, to a wireless communication apparatus and method configuring a multi-hop communication node tree able to effectively transmit data by decreasing communication load for data transmission and avoiding an obstacle in a multi-hop communication environment based on vehicle-to-anything (V2X) communication.

BACKGROUND

A V2X communication message has recently been standardized to intend to respond to a service of a Day2/3 application by adding sensor information in addition to basic vehicle information in a Day1 application. The sensor information may be used to estimate more accurate location information than location information based on an existing global positioning system (GPS), and may be used to calculate additional attribute information in association with a road attribute such as a lane.

V2X communication is performed based on a predetermined communication protocol for enabling a wireless access between vehicles which are moved at rapid speed, for example, a wireless access in vehicular environment (WAVE). In addition, the V2X communication uses a multi-hop technology for extending a range of vehicles which may be recognized as communication, and causes more communication load problems compared to one-hop based communication method.

SUMMARY

The present disclosure has been made to solve the above-mentioned problems occurring in the prior art while advantages achieved by the prior art are maintained intact.

An aspect of the present disclosure provides a wireless communication apparatus and method selecting an operation candidate application based on vehicle driving information and configuring a multi-hop communication node tree based on other vehicles having an attribute required for the corresponding operation candidate application, in order to effectively transmit data by decreasing communication load for data transmission and avoiding an obstacle in a multi-hop communication environment based on vehicle-to-anything (V2X) communication.

According to an exemplary embodiment of the present disclosure, a wireless communication method for supporting vehicle-to-vehicle wireless communication includes: determining an operation candidate application based on vehicle driving information of a self-vehicle; configuring a multi-hop communication node tree for communicating with a plurality of other vehicles according to the operation candidate application; and exchanging vehicle state information with the plurality of vehicles in which the multi-hop communication node is formed, and providing a notification service according to the vehicle state information received from one or more vehicles of the plurality of other vehicles.

In the determining of the operation candidate application, an operation candidate application for performing a left turn, a right turn, or an intersection movement of the self-vehicle at an intersection may be determined.

The providing of the notification service may include providing a warning service through an output device of the self-vehicle based on whether or not a vehicle approaching from a left road, a right road, or an opposite road in front of an intersection in relation to the self-vehicle exists, when the self-vehicle performs a left turn, a right turn, or an intersection movement at the intersection.

The configuring of the multi-hop communication node tree may include setting a communication node for a vehicle approaching from a left road of an intersection, a communication node for a vehicle approaching from a right road of the intersection, and/or a communication node for a vehicle approaching from an opposite road in front of the intersection, in the operation candidate application for a case in which the self-vehicle performs a left turn at the intersection.

The configuring of the multi-hop communication node tree may include setting a communication node for a vehicle approaching from a right road of an intersection and/or a communication node for a vehicle approaching from an opposite road in front of the intersection, in the operation candidate application for a case in which the self-vehicle performs a right turn at the intersection.

The configuring of the multi-hop communication node tree may include setting a communication node for a vehicle approaching from a left road of an intersection and a communication node for a vehicle approaching from a right road of the intersection, in the operation candidate application for a case in which the self-vehicle performs an intersection movement at the intersection.

The configuring of the multi-hop communication node tree may include setting a multi-hop communication node with which a first vehicle approaching from a left road and a second vehicle in the rear of the first vehicle participate in communication, and setting the multi-hop communication node with which the first and second vehicles approaching from the left road participate in the communication using a third vehicle approaching from an opposite road in front of the intersection as an intermediate node, upon determination that the vehicle approaching from the left road does not exist or a communication connection is not established due to an obstacle between the self-vehicle and the left road, in order to set a communication node for the vehicle approaching from the left road of the intersection.

The configuring of the multi-hop communication node tree may include setting a multi-hop communication node with which a first vehicle approaching from a right road and a second vehicle in the rear of the first vehicle participate in communication, and setting the multi-hop communication node with which the first and second vehicles approaching from the right road participate in the communication using a third vehicle approaching from an opposite road in front of the intersection as an intermediate node, upon determination that the vehicle approaching from the right road does not exist or a communication connection is not established due to an obstacle between the self-vehicle and the right road, in order to set a communication node for the vehicle approaching from the right road of the intersection.

According to another exemplary embodiment of the present disclosure, a wireless communication apparatus for supporting vehicle-to-vehicle wireless communication includes: an application determiner determining an operation candidate application based on vehicle driving information of a self-vehicle; a node setting part configuring a multi-hop communication node tree for communicating with a plurality of other vehicles according to the operation candidate application; and a service part exchanging vehicle state information with the plurality of vehicles in which the multi-hop communication node is formed, and providing a notification service according to the vehicle state information received from one or more vehicles of the plurality of other vehicles.

The application determiner may determine an operation candidate application for performing a left turn, a right turn, or an intersection movement of the self-vehicle at an intersection.

The service part may provide a warning service through an output device of the self-vehicle based on whether or not a vehicle approaching from a left road, a right road, or an opposite road in front of an intersection in relation to the self-vehicle exists, when the self-vehicle performs a left turn, a right turn, or an intersection movement at the intersection.

The node setting part may set a communication node for a vehicle approaching from a left road of an intersection, a communication node for a vehicle approaching from a left road of the intersection, and/or a communication node for a vehicle approaching from an opposite road in front of the intersection, in the operation candidate application for a case in which the self-vehicle performs a left turn at the intersection.

The node setting part may set a communication node for a vehicle approaching from a right road of an intersection and/or a communication node for a vehicle approaching from an opposite road in front of the intersection, in the operation candidate application for a case in which the self-vehicle performs a right turn at the intersection.

The node setting part may set a communication node for a vehicle approaching from a left road of an intersection and a communication node for a vehicle approaching from a right road of the intersection, in the operation candidate application for a case in which the self-vehicle performs an intersection movement at the intersection.

The node setting part may set a multi-hop communication node with which a first vehicle approaching from a left road and a second vehicle in the rear of the first vehicle participate in communication, and set the multi-hop communication node with which the first and second vehicles approaching from the left road participate in the communication using a third vehicle approaching from an opposite road in front of the intersection as an intermediate node, upon determination that the vehicle approaching from the left road does not exist or a communication connection is not established by an obstacle between the self-vehicle and the left road, in order to set a communication node for the vehicle approaching from the left road of the intersection.

The node setting part may set a multi-hop communication node with which a first vehicle approaching from a right road and a second vehicle in the rear of the first vehicle participate in communication, and set the multi-hop communication node with which the first and second vehicles approaching from the right road participate in the communication using a third vehicle approaching from an opposite road in front of the intersection as an intermediate node, upon determination that the vehicle approaching from the right road does not exist or a communication connection is not established by an obstacle between the self-vehicle and the right road, in order to set a communication node for the vehicle approaching from the right road of the intersection.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
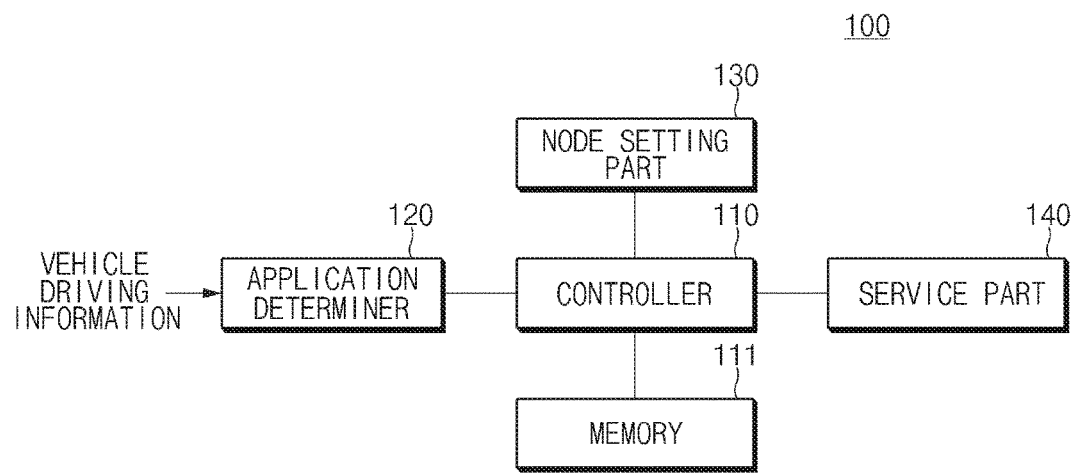
FIG. 1 is a schematic diagram of a wireless communication apparatus for supporting vehicle-to-vehicle wireless communication according to an exemplary embodiment of the present disclosure.

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various exemplary embodiments and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

FIG. 1 is a schematic diagram of a wireless communication apparatus 100 for supporting vehicle-to-vehicle wireless communication according to an exemplary embodiment of the present disclosure.

Referring to FIG. 1, the wireless communication apparatus 100 for supporting vehicle-to-vehicle wireless communication according to an exemplary embodiment of the present disclosure includes a controller 110, a memory 111, an application determiner 120, a node setting part 130, and a service part 140. The respective components of the wireless communication apparatus 100 according to an exemplary embodiment of the present disclosure may be implemented by hardware such as a semiconductor processor, software such as an application program, or a combination thereof.

The controller 110 performs a general control of the respective components 111, 120, 130, and 140 of the wireless communication apparatus 100. The controller 110 may be implemented to be operated to include all or some of functions of other components 111, 120, 130, and 140, and some of the functions of the controller 110 may also be separated into separate units to be implemented.

The memory 111 is a means for storing predetermined data or a set value required for an operation of the wireless communication apparatus 100, and data generated during the operation of the wireless communication apparatus 100 may be stored or updated in the memory 111 managed by the controller 110.

The application determiner 120 determines an operation candidate application based on vehicle driving information of a self vehicle. Here, the vehicle driving information includes information such as speed of vehicle, a turn (left turn/right turn) signal, a braking signal, and the like which may be received through a controller area network (CAN) bus, or vehicle global positioning system (GPS) information or path information which may be received through a GPS/navigation system.

The application determiner 120 may judge whether or not the self-vehicle enters an intersection based on the above-mentioned vehicle driving information, and may also determine an operation candidate application for a left turn, a right turn, or an intersection movement of the self-vehicle at the intersection. Hereinafter, an operation candidate application for a left turn is referred to as a left turn assist (LTA) application, an operation candidate application for a right turn is referred to as a right turn assist (RTA) application, and an operation candidate application for an intersection movement is referred to as an intersection movement assist (IMA) application.

The node setting part 130 configures a multi-hop communication node tree for communicating with a plurality of other vehicles according to the operation candidate application determined by the application determiner 120.

Figure 2:
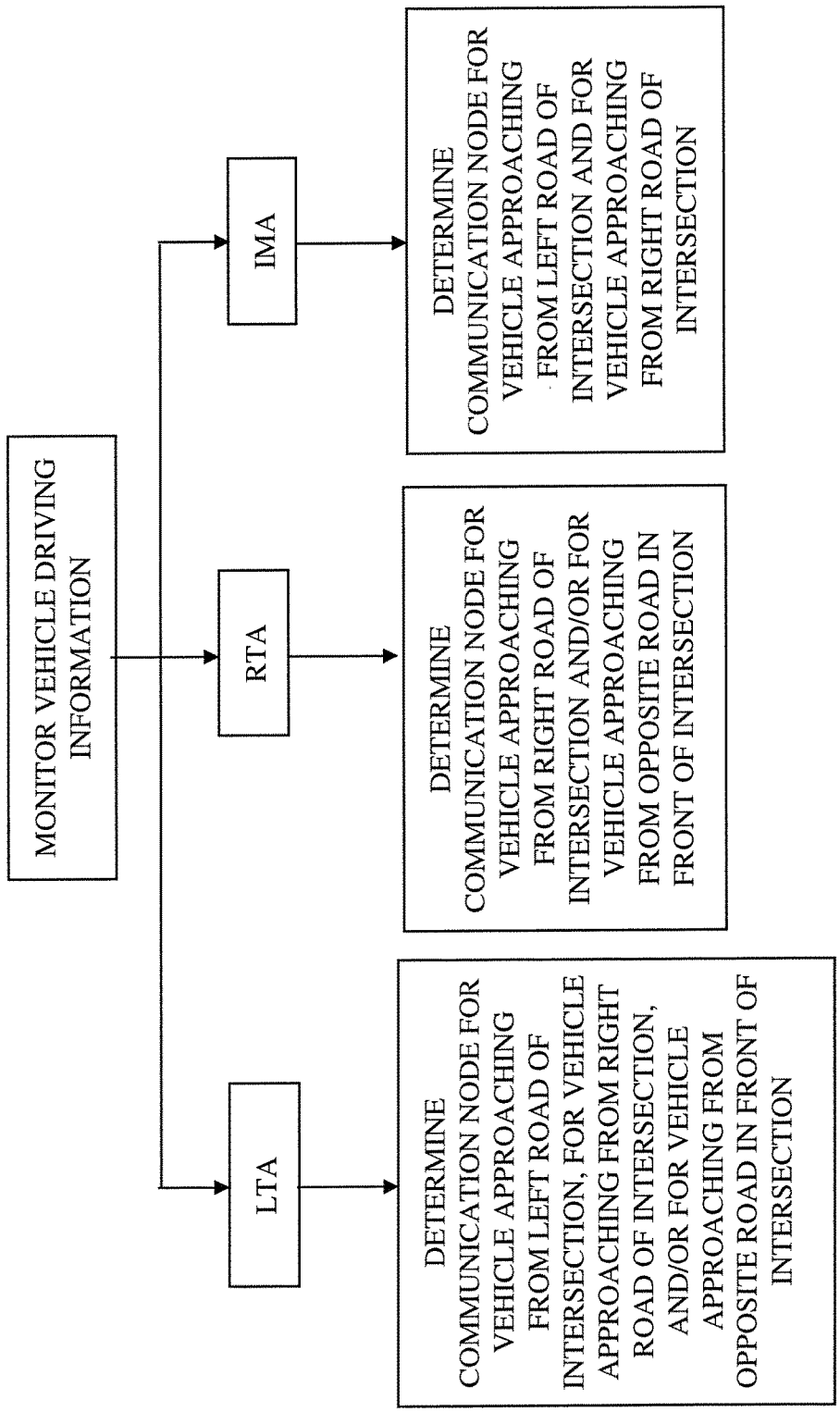
FIG. 2 is a diagram illustrating a concept of a notification service at an intersection using the wireless communication apparatus according to an exemplary embodiment of the present disclosure.

For example, as illustrated in FIG. 2, the node setting part 130 may set a communication node for a vehicle approaching from a left road of the intersection, a communication node for a vehicle approaching from a right road of the intersection, and a multi-hop communication node for a vehicle approaching from an opposite road in front of the intersection, respectively, in the operation candidate application (LTA) for a case in which the vehicle performs the left turn at the intersection. The multi-hop communication node for the vehicle approaching from the opposite road in front of the intersection in the self-vehicle corresponds to a case in which a communication connection of the self-vehicle with a second vehicle in the rear of a first vehicle via the first vehicle approaching from the opposite road in front of the intersection is made. The communication node for the vehicle approaching from the left road of the intersection and the communication node for the vehicle approaching from the right road of the intersection will be described below in detail.

In addition, as illustrated in FIG. 2, the node setting part 130 may set the communication node for the vehicle approaching from the right road of the intersection, in the operation candidate application (RTA) for a case in which the self-vehicle performs the right turn at the intersection.

In addition, as illustrated in FIG. 2, the node setting part 130 may set the communication node for the vehicle approaching from the left road of the intersection and the communication node for the vehicle approaching from the right road of the intersection, in the operation candidate application (IMA) for a case in which the self-vehicle performs the intersection movement at the intersection.

The service part 140 exchanges vehicle state information with the plurality of vehicles in which the multi-hop communication node is formed by the node setting part 130, and provides a notification service according to the vehicle state information received from one or more vehicles.

Here, the vehicle state information, which is basic information for detecting a state of the vehicle in which the multi-hop communication node is formed to provide the notification service required for a driver of the self-vehicle, may include information such as speed/acceleration/yaw-rate of the vehicle, a turn (left turn/right turn) signal, a braking signal, and the like which may be received through a CAN bus, or vehicle GPS information or path information which may be received through a GPS/navigation system. The vehicle state information may be the same as the vehicle driving information described above, but may also include additional information, and some of the vehicle driving information may not be included in the vehicle state information.

The service part 140 may provide a warning service through an output device (e.g., a speaker for outputting a voice or a display device for displaying visual information) of the self-vehicle based on whether or not another vehicle approaching from the left road, the right road, or the front opposite road of the intersection with respect to the self-vehicle exists, when the self-vehicle performs the left turn, the right turn, or the intersection movement at the intersection, in relation to the vehicle state information received from one or more vehicles of the vehicles in which the multi-hop communication node is formed.

Hereinafter, an operation of the wireless communication apparatus 100 according to an exemplary embodiment of the present disclosure will be described in more detail with reference to the flow charts of FIGS. 3 and 5.

First, in the case in which the operation candidate applications (LTA, RTA, and IMA) described above are operated, it needs to provide the warning service to the driver according to the state of the vehicle such as speed, a location, or the like of the vehicle approaching from the left road of the intersection in relation to the self-vehicle, for each of the operation candidate applications.

Figure 3:
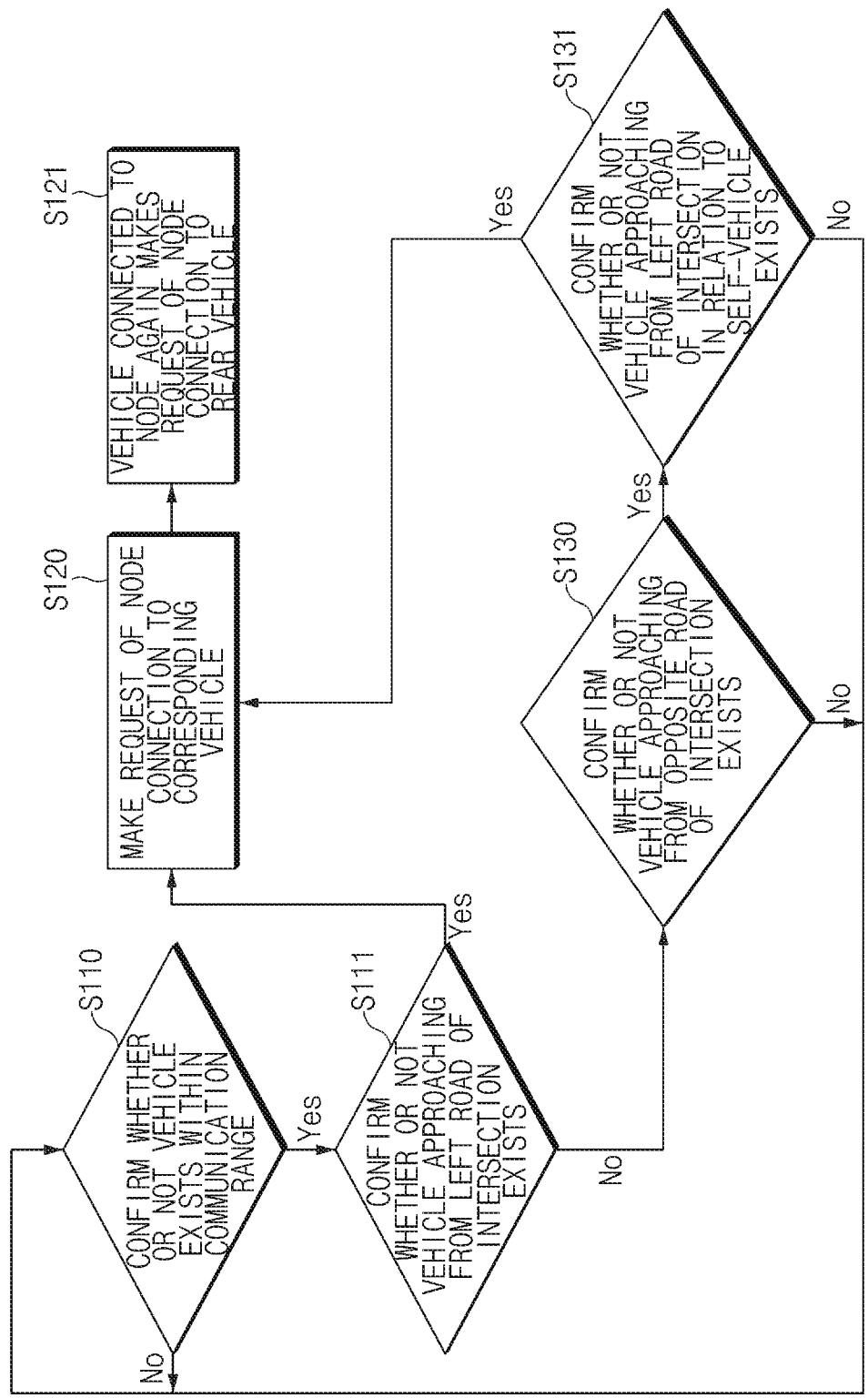
FIG. 3 is a flow chart of a method to configure a multi-hop communication node tree with a vehicle approaching from a left road of an intersection in the wireless communication apparatus according to an exemplary embodiment of the present disclosure.

Accordingly, in the case in which the operation candidate applications (LTA, RTA, and IMA) are operated, the node setting part 130 may be operated as illustrated in FIG. 3 to set the communication node for the vehicle approaching from the left road of the intersection in relation to the self-vehicle.

FIG. 3 is a flow chart of a method to configure a multi-hop communication node tree with a vehicle approaching from a left road of an intersection in the wireless communication apparatus 100 according to an exemplary embodiment of the present disclosure.

First, the node setting part 130 confirms whether or not communication enable vehicles exist around a communication range while transmitting and receiving a signal in a communication method according to a protocol for a vehicle-to-vehicle communication such as a wireless access in vehicular environment (WAVE) (S110).

Figure 4:
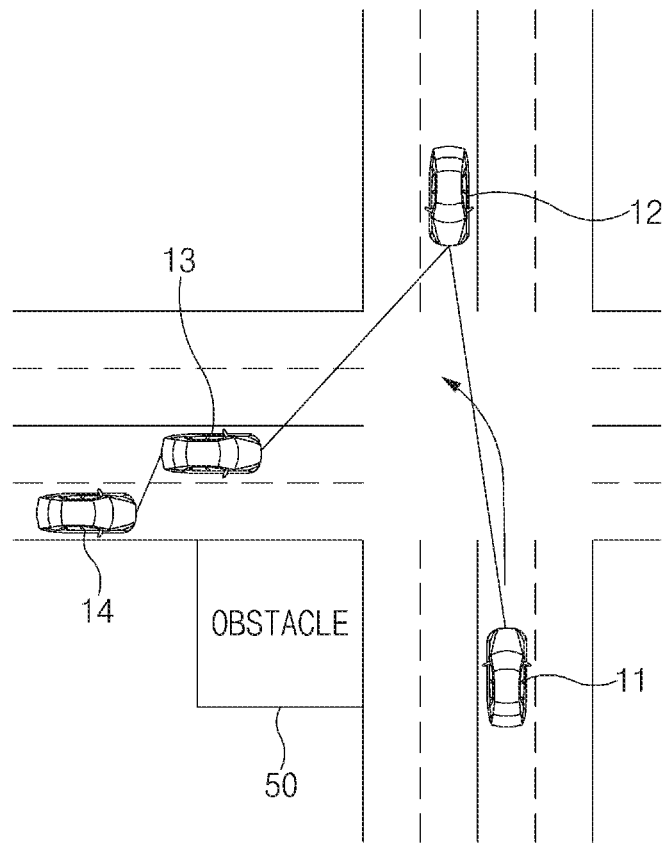
FIG. 4 is a diagram which is referenced to illustrate FIG. 3.

In this case, if the communication enable vehicles exist around the self-vehicle, as illustrated in FIG. 4, the node setting part 130 confirms whether or not vehicles 13 and 14 approaching from the left road exist by transmitting and receiving a predetermined signal, in order to set the communication node for the vehicle approaching from the left road at the intersection in relation to the self-vehicle 11 (S111).

If the existence of the vehicles 13 and 14 approaching from the left road is confirmed, the node setting part 130 makes a request of a node connection to the first vehicle (e.g., a vehicle closest to the opposite side of the left road) approaching from the left road to thereby form a communication connection between nodes (S120). If the communication connection between the self-vehicle 11 and the first vehicle 13 is formed, the first vehicle 13 connected to the self-vehicle 11 makes a request of the node connection to another vehicle in the rear of the first vehicle 13, that is, a second vehicle 14, to thereby form the communication connection between the nodes (S121).

The multi-hop communication node enabling communication between the self-vehicle 11 and the second vehicle 14 is formed according to the connection of the communication node between the self-vehicle 11 and the first vehicle 13, and the connection of the communication node between the first vehicle 13 and the second vehicle 14. The node setting part 130 of the self-vehicle sets the multi-hop communication node with which the first vehicle 13 approaching from the left road and the second vehicle 14 in the rear of the first vehicle 13 participate in the communication (participate in the communication with the self-vehicle), to thereby support so that the communication with the first vehicle 13 or the second vehicle 14 is made in the self-vehicle 11.

However, in the case in which the vehicles approaching from the left road do not exist, or the communication connection is not established due to an obstacle 50 between the self-vehicle 11 and the left road, if the existence of the vehicles 13 and 14 approaching from the left road is not confirmed (S111), the node setting part 130 may set the multi-hop communication node using a third vehicle 12 approaching from an opposite road in front of the intersection as an intermediate node (S130, S131).

For example, the node setting part 130 may set the multi-hop communication node in which the first vehicle 13 and the second vehicle 14 approaching from the left road participate in the communication (participate in the communication with the self-vehicle) using the third vehicle 12 as the intermediate node (or a relay node), as in S120 and S121, by confirming the existence of the third vehicle 12 approaching from the opposite road in front of the intersection (S130) and confirming the existence of the vehicle 13 or 14 approaching from the left road in relation to the self-vehicle (S131).

That is, the node setting part 130 may set the multi-hop communication node in which the vehicles 13 and 14 approaching from the left road participate in the communication (participate in the communication with the self-vehicle), using the third vehicle 12 approaching from the opposite road in front of the intersection as the intermediate node. That is, the self-vehicle 11 may form the multi-hop communication node enabling the communication with the first vehicle 13 or the second vehicle 14 even though the obstacle 50 exists, by communicating with the first vehicle 13 or the second vehicle 14 approaching from the left road through the third vehicle 12 approaching from the opposite road in front of the self-vehicle 11.

Meanwhile, in the case in which the operation candidate applications (LTA and IMA) described above are operated, it needs to also provide the warning service to the driver according to the state of the vehicle such as speed, a location, or the like of the vehicle approaching from the right road of the intersection in relation to the self-vehicle, for each of the operation candidate applications.

Figure 5:
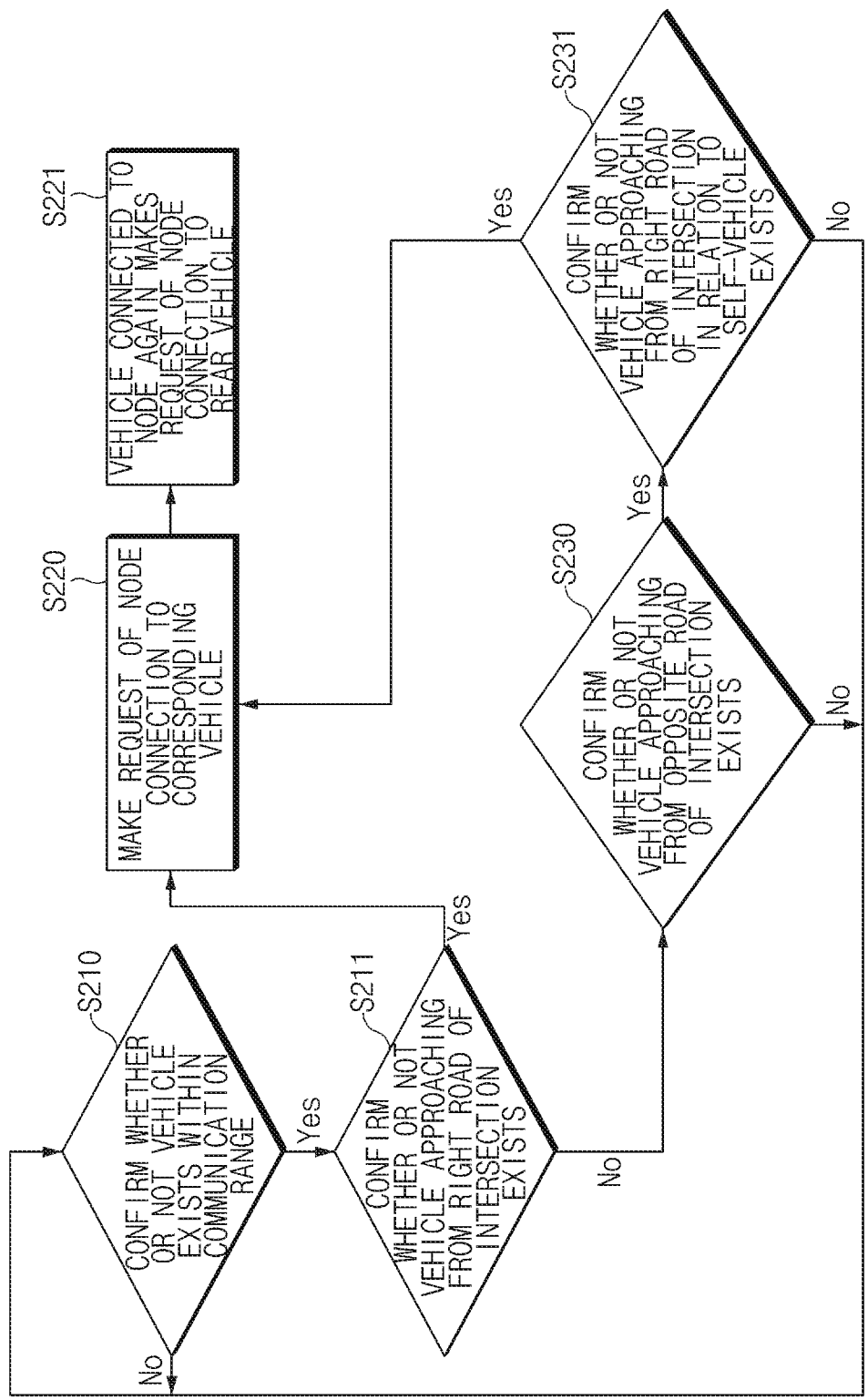
FIG. 5 is a flow chart of a method to configure a multi-hop communication node tree with a vehicle approaching from a right road of an intersection in the wireless communication apparatus according to an exemplary embodiment of the present disclosure.

Accordingly, in the case in which the operation candidate applications (LTA and IMA) are operated, the node setting part 130 may be operated as illustrated in FIG. 5 to set the communication node for the vehicle approaching from the right road of the intersection in relation to the self-vehicle.

FIG. 5 is a flow chart of a method to configure a multi-hop communication node tree with a vehicle approaching from a right road of an intersection in the wireless communication apparatus 100 according to an exemplary embodiment of the present disclosure.

First, the node setting part 130 confirms whether or not communication enable vehicles exist around a communication range while transmitting and receiving a signal in a communication method according to a protocol for a vehicle-to-vehicle communication such as a wireless access in vehicular environment (WAVE) (S210).

Figure 6:
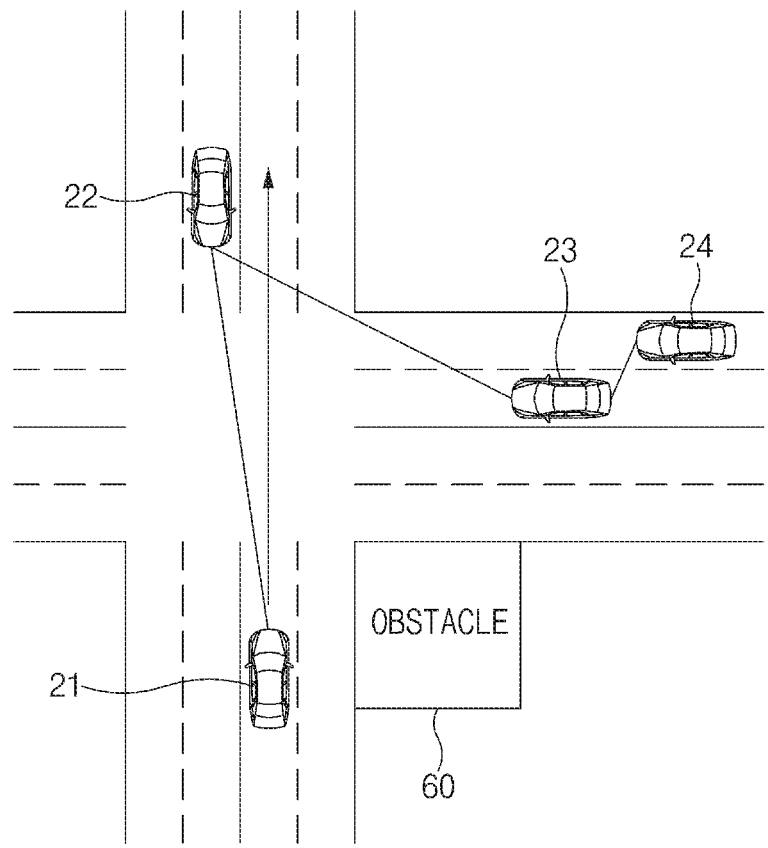
FIG. 6 is a diagram which is referenced to illustrate FIG. 5.

In this case, if the communication enable vehicles exist around a self-vehicle, as illustrated in FIG. 6, the node setting part 130 confirms whether or not vehicles 23 and 24 approaching from the right road exist by transmitting and receiving a predetermined signal, in order to set the communication node for the vehicle approaching from the right road at the intersection in relation to the self-vehicle 21 (S211).

If the existence of the vehicles 23 and 24 approaching from the right road is confirmed, the node setting part 130 makes a request of a node connection to the first vehicle 23 (e.g., a vehicle closest to the opposite side of the right road) approaching from the right road to thereby form a communication connection between nodes (S220). If the communication connection between the self-vehicle and the first vehicle 23 is formed, the first vehicle 23 connected to the self-vehicle makes a request of the node connection to another vehicle in the rear of the first vehicle 23, that is, a second vehicle 24, to thereby form the communication connection between the nodes (S221).

The multi-hop communication node enabling communication between the self-vehicle 21 and the second vehicle 24 is formed according to the connection of the communication node between the self-vehicle 21 and the first vehicle 23, and the connection of the communication node between the first vehicle 23 and the second vehicle 24. The node setting part 130 of the self-vehicle sets the multi-hop communication node in which the first vehicle 23 approaching from the right road and the second vehicle 24 in the rear of the first vehicle 23 participate in the communication (participate in the communication with the self-vehicle), to thereby support so that the communication with the first vehicle 23 or the second vehicle 24 is made in the self-vehicle 21.

However, in the case in which the vehicles approaching from the right road do not exist, or the communication connection is not established due to an obstacle 60 between the self-vehicle 21 and the right road, if the existence of the vehicles 23 and 24 approaching from the right road is not confirmed (S211), the node setting part 130 may set the multi-hop communication node using a third vehicle 22 approaching from an opposite road in front of the intersection as an intermediate node (S230, S231).

For example, the node setting part 130 may set the multi-hop communication node in which the first vehicle 23 and the second vehicle 24 approaching from the right road participate in the communication (participate in the communication with the self-vehicle) using the third vehicle 22 as the intermediate node (or a relay node), as in S220 and S221, by confirming the existence of the third vehicle 22 approaching from the opposite road in front of the intersection (S230) and confirming the existence of the vehicle 23 or 24 approaching from the right road in relation to the self-vehicle (S231).

That is, the node setting part 130 may set the multi-hop communication node in which the vehicles 23 and 24 approaching from the right road participate in the communication (participate in the communication with the self-vehicle), using the third vehicle 22 approaching from the opposite road in front of the intersection as the intermediate node. That is, the self-vehicle 21 may form the multi-hop communication node enabling the communication with the first vehicle 23 or the second vehicle 24 even though the obstacle 60 exists, by communicating with the first vehicle 23 or the second vehicle 24 approaching from the right road through the third vehicle 22 approaching from the opposite road in front of the self-vehicle 21.

Figure 7:
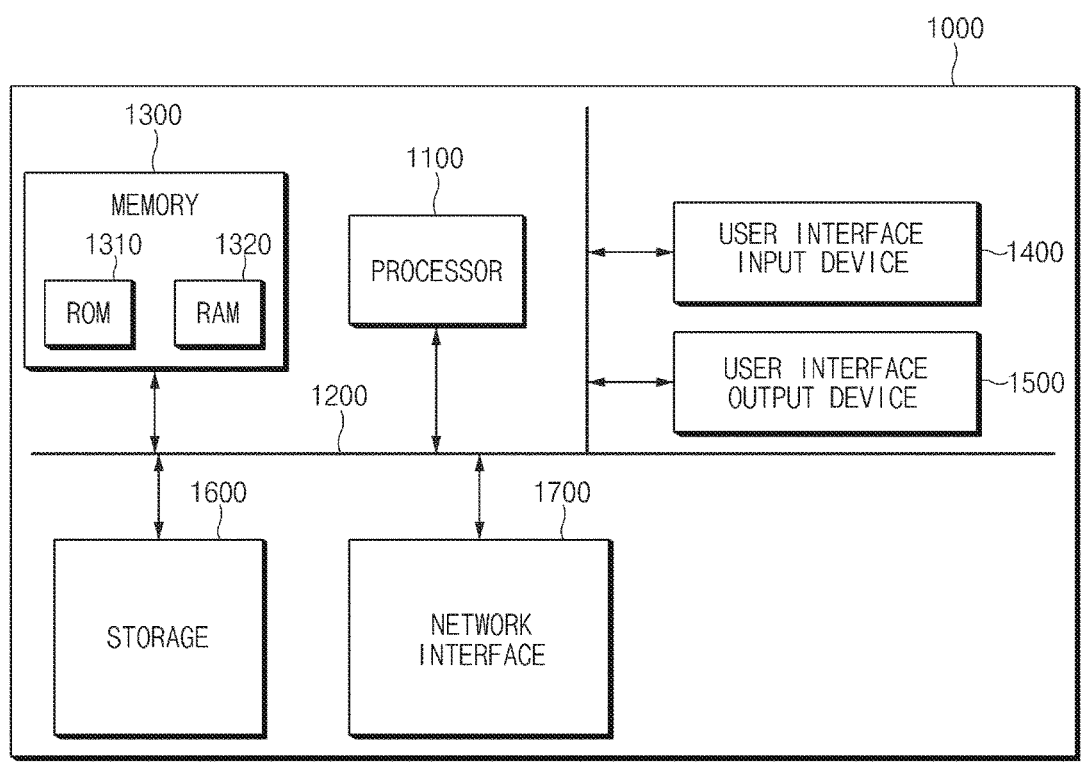
FIG. 7 is a schematic diagram of a computing system for implementing a wireless communication apparatus according to an exemplary embodiment of the present disclosure.

FIG. 7 is a schematic diagram of a computing system for implementing a wireless communication apparatus 100 according to an exemplary embodiment of the present disclosure. The wireless communication apparatus 100 according to an exemplary embodiment of the present disclosure may be implemented by hardware, software, or a combination thereof. For example, the wireless communication apparatus 100 may be implemented by a computing system 1000 as illustrated in FIG. 7.

The computing system 1000 may include at least one processor 1100, a memory 1300, a user interface input device 1400, a user interface output device 1500, a storage 1600, and a network interface 1700 which are connected through a bus 1200. The processor 1100 may be a central processing unit (CPU) or a semiconductor device executing processes for instructions which are stored in the memory 1300 and/or the storage 1600. The memory 1300 and the storage 1600 may include various kinds of volatile or non-volatile storing media. For example, the memory 1300 may include a read only memory (ROM) 1310 and a random access memory (RAM) 1320.

Accordingly, steps in the method or algorithm which is described in context with the exemplary embodiments disclosed in the present specification may be directly implemented in hardware, a software module, or a combination thereof which is executed by the processor 1100. The software module may be resided on a storing medium (i.e., the memory 1300 and/or the storage 1600) such as a RAM memory, a flash memory, a ROM memory, an erasable programmable read only memory (EPROM), an electrically erasable programmable read only memory (EEPROM), a register, a hard disk, a removable disk, or a compact disc-read only memory (CD-ROM). An exemplary storing medium may be coupled to the processor 1100 and the processor 1100 may read information from the storing medium and write the information into the storing medium. Alternatively, the storing medium may be integral with the processor 1100. The processor and the storing medium may also be resided within an application specific integrated circuit (ASIC). The ASIC may also be resided within a user terminal. Alternatively, the processor and the storing medium may also be resided within the user terminal as a separate component.

As described above, according to the exemplary embodiments of the present disclosure, the wireless communication apparatus and method for supporting vehicle-to-vehicle wireless communication select the operation candidate application based on the vehicle driving information (e.g., the vehicle speed, the turn signal, the location, the path, etc.) and configure the multi-hop communication node tree based on the other vehicles having the attribute required for the corresponding operation candidate application, thereby making it possible to effectively transmit the data by decreasing the communication load for the data transmission in the multi-hop communication environment based on the V2X communication and avoiding the obstacle in the case in which the communication is not established by the obstacle at an intersection.

For example, in order to commonly set the communication node with the vehicle approaching from the left road of the intersection in the LTA/RTA/IMA candidate applications, in the case in which when the self-vehicle enters the intersection, the vehicle approaching from the left road of the intersection exists, the node connection with the vehicle in the rear of the vehicle approaching from the left road, and in the case in which the vehicle approaching from the left road does not exist or the communication connection with the left vehicle is disabled by the left obstacle, the communication node with the left vehicle is set using the vehicle approaching from the opposite road of the intersection as the relay node, thereby making it possible to perform the warning depending on the location/speed of the approaching vehicle.

In addition, in order to commonly set the communication node with the vehicle approaching from the right road of the intersection in the LTA/IMA candidate applications, in the case in which when the self-vehicle enters the intersection, the vehicle approaching from the right road of the intersection exists, the node connection with the vehicle in the rear of the vehicle approaching from the right road, and in the case in which the vehicle approaching from the right road does not exist or the communication connection with the right vehicle is disabled by the right obstacle, the communication node with the right vehicle is set using the vehicle approaching from the opposite road of the intersection as the relay node, thereby making it possible to perform the warning depending on the location/speed of the approaching vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless communication method for supporting vehicle-to-vehicle wireless communication, the wireless communication method comprising:

determining an operation candidate application based on vehicle driving information of a self-vehicle;

configuring a multi-hop communication node tree for communicating with a plurality of other vehicles according to the operation candidate application; and exchanging vehicle state information with the plurality of other vehicles in which the multi-hop communication node tree is formed, and providing a notification service according to the vehicle state information received from one or more vehicles of the plurality of other vehicles, wherein the configuring of the multi-hop communication node tree includes:

setting a first communication node between the self-vehicle and a first vehicle approaching from a left road or a right road in relation to the self-vehicle;

forming a communication connection between the first communication node and a second communication node, which is set between the first vehicle and a second vehicle in the rear of the first vehicle, via the first vehicle;

setting a multi-hop communication node with the first vehicle and the second vehicle, and setting the multi-hop communication node with which the first and second vehicles approaching from the left road or the right road participate in the communication using a third vehicle approaching from an opposite road in front of the intersection as an intermediate node, upon determination that the first vehicle approaching from the left road or the right road does not exist or a communication connection is not established due to an obstacle between the self-vehicle, and the left road or the right road, in order to set a communication node for the vehicle approaching from the left road or the right road of the intersection.

2. The wireless communication method according to claim 1, wherein in the determining of the operation candidate application, an operation candidate application for performing a left turn, a right turn, or an intersection movement of the self-vehicle at an intersection is determined.

3. The wireless communication method according to claim 1, wherein the providing of the notification service includes providing a warning service through an output device of the self-vehicle based on whether or not a vehicle approaching from the left road, the right road, or an opposite road in front of an intersection in relation to the self-vehicle exists, when the self-vehicle performs a left turn, a right turn, or an intersection movement at the intersection.

4. The wireless communication method according to claim 1, wherein the configuring of the multi-hop communication node tree further includes:

setting a communication node for a vehicle approaching from a left road of an intersection, a communication node for a vehicle approaching from a right road of the intersection, and/or a communication node for a vehicle approaching from an opposite road in front of the intersection, in the operation candidate application for a case in which the self-vehicle performs a left turn at the intersection.

5. The wireless communication method according to claim 1, wherein the configuring of the multi-hop communication node tree further includes:

setting a communication node for a vehicle approaching from a right road of an intersection and/or a communication node for a vehicle approaching from an opposite road in front of the intersection, in the operation candidate application for a case in which the self-vehicle performs a right turn at the intersection.

6. The wireless communication method according to claim 1, wherein the configuring of the multi-hop communication node tree further includes:

setting a communication node for a vehicle approaching from a left road of an intersection and a communication node for a vehicle approaching from a right road of the intersection, in the operation candidate application for a case in which the self-vehicle performs an intersection movement at the intersection.

7. A wireless communication apparatus for supporting vehicle-to-vehicle wireless communication, the wireless communication apparatus comprising:

a processor; and a memory storing computer readable algorithm that, when executed, causes the processor to:

determine an operation candidate application based on vehicle driving information of a self-vehicle;

configure a multi-hop communication node tree for communicating with a plurality of other vehicles according to the operation candidate application; and exchange vehicle state information with the plurality of other vehicles in which the multi-hop communication node tree is formed, and provide a notification service according to the vehicle state information received from one or more vehicles of the plurality of other vehicles, wherein the memory further stores computer readable algorithm that, when executed, causes the processor to:

set a first communication node between the self-vehicle and a first vehicle approaching from a left road or a right road in relation to the self-vehicle;

form a communication connection between the first communication node and a second communication node, which is set between the first vehicle and a second vehicle in the rear of the first vehicle, via the first vehicle;

set a multi-hop communication node with the first vehicle and the second vehicle; and set the multi-hop communication node with which the first and second vehicles approaching from the left road or the right road participate in the communication using a vehicle approaching from an opposite road in front of the intersection as an intermediate node, upon determination that the vehicle approaching from the left road does or the right road not exist or a communication connection is not established due to an obstacle between the self-vehicle, and the left road or the right road, in order to set a communication node for the vehicle approaching from the left road or the right road of the intersection.

8. The wireless communication apparatus according to claim 7, wherein the memory further stores computer readable algorithm that, when executed, causes the processor to:

determine an operation candidate application for performing a left turn, a right turn, or an intersection movement of the self-vehicle at an intersection.

9. The wireless communication apparatus according to claim 7, wherein the memory further stores computer readable algorithm that, when executed, causes the processor to:

provide a warning service through an output device of the self-vehicle based on whether or not a vehicle approaching from the left road, the right road, or an opposite road in front of an intersection in relation to the self-vehicle exists, when the self-vehicle performs a left turn, a right turn, or an intersection movement at the intersection.

10. The wireless communication apparatus according to claim 7, wherein the memory further stores computer readable algorithm that, when executed, causes the processor to:

set a communication node for a vehicle approaching from a left road of an intersection, a communication node for a vehicle approaching from a right road of the intersection, and/or a communication node for a vehicle approaching from an opposite road in front of the intersection, in the operation candidate application for a case in which the self-vehicle performs a left turn at the intersection.

11. The wireless communication apparatus according to claim 7, wherein the memory further stores computer readable algorithm that, when executed, causes the processor to:

set a communication node for a vehicle approaching from a right road of an intersection and/or a communication node for a vehicle approaching from an opposite road in front of the intersection, in the operation candidate application for a case in which the self-vehicle performs a right turn at the intersection.

12. The wireless communication apparatus according to claim 7, wherein the memory further stores computer readable algorithm that, when executed, causes the processor to:

set a communication node for a vehicle approaching from a left road of an intersection and a communication node for a vehicle approaching from a right road of the intersection, in the operation candidate application for a case in which the self-vehicle performs an intersection movement at the intersection.

* * * * *